H. O. LEHMAN.
TOOL HOLDER.
APPLICATION FILED JULY 25, 1918.
1,320,698.
Patented Nov. 4, 1919.
2 SHEETS—SHEET 1.
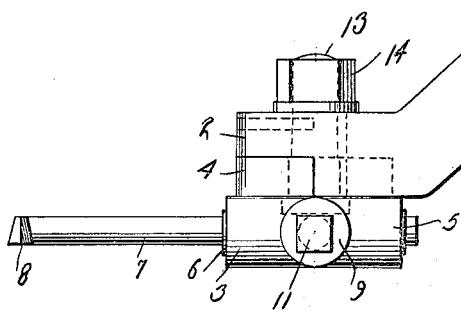
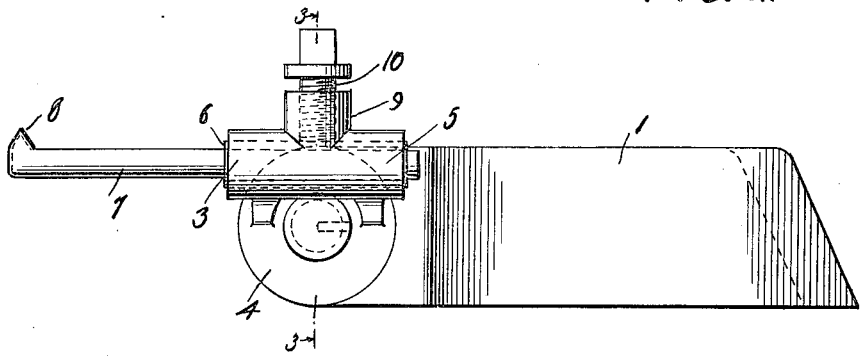
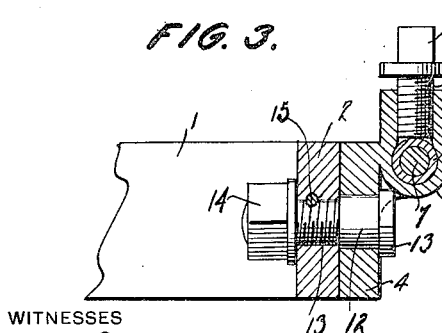
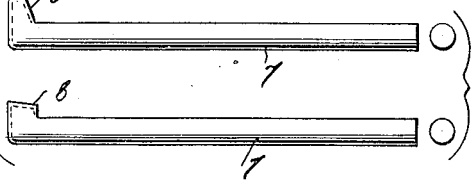
INVENTOR
Howard O. Lehman
WITNESSES
BY
ATTORNEY

H. O. LEHMAN.
TOOL HOLDER.
APPLICATION FILED JULY 25, 1918.

1,320,698.

Patented Nov. 4, 1919.

WITNESSES
W. C. Fielding
Wm H Mulligan

INVENTOR
Howard O. Lehman
BY Richard Owen
ATTORNEY

UNITED STATES PATENT OFFICE.

HOWARD OWEN LEHMAN, OF BARBERTON, OHIO.

TOOL-HOLDER.

1,320,698. Specification of Letters Patent. Patented Nov. 4, 1919.

Application filed July 25, 1918. Serial No. 246,722.

*To all whom it may concern:*

Be it known that I, HOWARD O. LEHMAN, a citizen of the United States, residing at Barberton, in the county of Summit and State of Ohio, have invented certain new and useful Improvements in Tool-Holders, of which the following is a specification.

This invention relates to tools and more particularly to lathe tools, the primary object being to provide a device for utilizing a relatively small piece of tool steel for performing the cutting or boring operation.

The popular method of constructing lathe tools is to take a relatively large size piece of tool steel and forge one end thereof to reduce it to the proper size and grind the end to provide the proper point for the tool which performs the cutting operation.

The excess steel in the remaining portion of the piece usually forms a shank adapted to be attached to the tool post of the lathe. Since tool steel is expensive it will be obvious that there is considerable waste in this manner of forming a cutting tool.

My object, therefore, is to provide a tool holder adapted for attachment to the tool post of a lathe and designed to hold a comparatively small piece of tool steel on one end of which the cutting point is provided whereby a number of tools of different types may be formed from the same quantity of steel employed in forming a tool in the objectionable manner above set forth.

A further object of this invention is the provision of a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which like numerals of reference indicate corresponding parts throughout the several views, in which:—

Figure 1 is a plan view of a tool holder and tool constructed in accordance with my invention.

Fig. 2 is a side elevation thereof.

Fig. 3 is a section taken on the line 3—3 of Fig. 2.

Figs. 10 and 11 are detail views of the different types of tools which may be attached to the holder.

Figure 4:
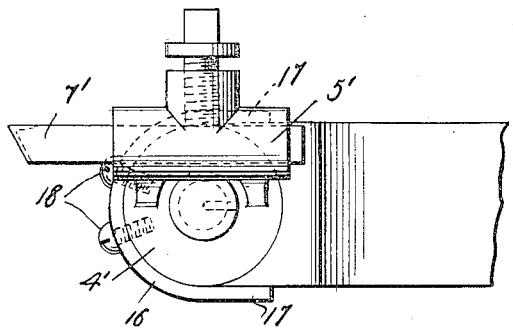
Fig. 4 is a side elevation of a modified form of the tool holder.

Referring particularly to Figs. 1, 2 and 3 of the drawings, it will be noted that the attaching bar 1 is of relatively large size and has one end bent at an angle with respect to the main portion of the bar, this end being in the form of a substantially circular flange 2 forming an attaching plate to which the tool head 3 is attached. The tool head comprises the attaching disk 4 having a tool sleeve 5 integrally formed therewith, the longitudinal center line of the sleeve being disposed at a tangent with respect to the periphery of the disk 4. The sleeve is also offset as shown to advantage in Figs. 1 and 3. A suitable size bushing 6 is mounted in the central bore of the sleeve 5 and is adapted to receive the shank 7 of a boring tool, the point of which is shaped as indicated at 8 to provide the cutting point which engages the work to be shaped or bored. Intermediate the length of the sleeve, a boss 9 is formed which extends upwardly and has a central screw threaded passage-way in which is received the screw threaded end of a set screw 10 having a head 11 which may be engaged by a wrench to tighten the set screw for holding the shank 7 of the tool in firm position in the tool sleeve.

Figure 5:
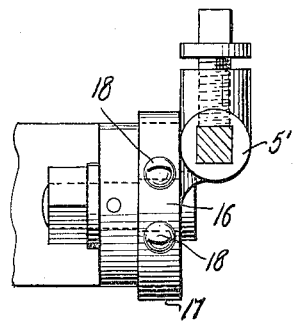
Fig. 5 is an end view of the same.

The tool head is rotatably connected to the disk or attaching plate 2 by a pin having a smooth shank portion 12 extended through a central opening in the disk 4 and which is provided with a head 13 engageable with the outer face of the disk. A screw threaded portion 13 is extended through an opening in the attaching plate 2 and the extended end is provided with a nut 14 which may be tightened against the attaching plate 2 for holding the tool holder tightly to the attaching plate when the tool has been properly adjusted. A key 15 fits in a keyway formed in the shank 13 and the flange or attaching plate 2 as shown in Fig. 3, of the drawing, thereby preventing loosening of the tool head after it has been fixed in position. Figs. 4 and 5 illustrate a slightly modified form of the holder which is the same as the one above described with the exception of a spring band 16 which is of substantially semi-circular formation and has it ends extended to form spring fingers 17. This spring band fits over the periphery of the attaching disk 4' and the latter is provided with screw threaded recesses for the reception of fastening screws 18 which extend through openings in the band and are received in the screw threaded recesses. In this type of tool holder, also, the sleeve 5' has a square longitudinal passage-way for the reception of the squared tool 7' and since these types of tools have a tendency to chatter while in use, the strong rigid spring 16 and the fingers 17 will hold the tool firmly and prevent chattering thereof while the tool is cutting.

Figure 6:
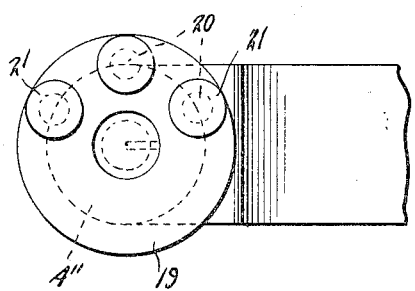
Fig. 6 is a fragmentary side elevation of a spring winding tool as used with my invention.
Figure 7:
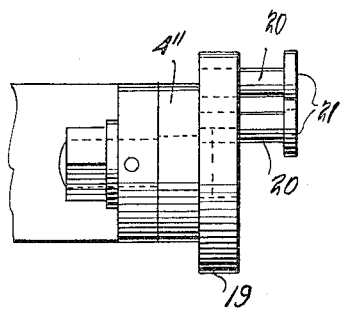
Fig. 7 is an end elevation of the same.
Figure 8:
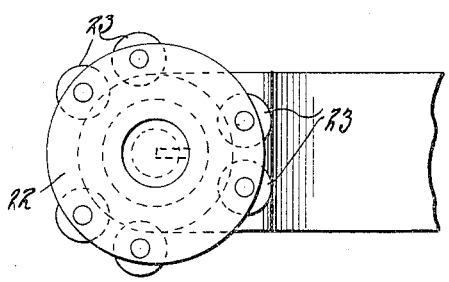
Fig. 8 is a fragmentary side elevation of a nurling tool.
Figure 9:
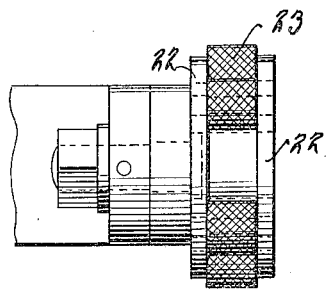
Fig. 9 is an end elevation of the same.
Figure 11:
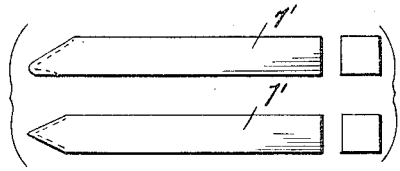

In Figs. 6 and 7 I have illustrated a further modified form of tool holder which is adapted for spring winding, the disk 4" carrying a circular plate 19 from which studs 20 project. These are arranged in relatively close proximity as shown in Fig. 6 and are circumferentially spaced and provided at their ends with heads 21. These studs 20 form guide spools over which a strand of wire is passed while a spring is being formed on a bar or the like attached in the lathe chuck in the usual manner. A nurling tool is illustrated in Figs. 8 and 9 and is constructed in the same manner as the tools above described except for the provision of laterally spaced flanges 22 which are carried by the attaching disks and have spaced therebetween the nurling rollers 23 the faces of which are suitably cut to form the knurl on the piece of work. The types of tools shown in Figs. 10 and 11 can be varied in formation but it will be noted that they are formed on relatively small pieces of tool steel so that a large number of tools may be constructed from substantially the same quantity of tool steel previously employed for constructing a single tool under the old method.

The foregoing description and accompanying drawing have reference to what might be considered the preferred or approved form of my invention. I desire it to be understood that I may make such changes in the construction and arrangement of parts, materials, dimensions, et cetera, as may fall within the scope of the appended claims.

Having thus fully described my invention what I claim as new and desire to secure by Letters Patent, is:—

1. A tool holder for lathes comprising an attaching bar having one end shaped to form a flange, the attaching bar being adapted for attachment to the tool post of a lathe, and a tool head mounted on the said flange for rotary movement and provided with a sleeve for receiving a tool.

2. A tool holder for lathes comprising a supporting arm adapted for attachment to the tool post of a lathe, a tool head mounted on the arm and including an attaching disk having a tangentially disposed sleeve, a relatively small tool provided with a shank adapted for reception in the sleeve, means to hold the tool in the sleeve and means for rotatably mounting the said tool holder on the end of the said arm.

3. A tool holder comprising an attaching bar having one end shaped to form a substantially circular flange provided with a central opening, an attaching disk mounted on the flange, a stud adapted to be projected through the said opening and having its screw threaded end to receive a fastening element for maintaining the disk and flange in operative engagement and a tool holding element attached to the said disk.

4. A tool holder comprising an attaching bar having one end shaped to form a substantially circular flange provided with a central opening, an attaching disk mounted on the flange and provided with a central opening, a stud adapted to be projected through the said openings and having a screw threaded end to receive a fastening element for maintaining the disk and flange in operative engagement, a tool holding element attached to the said disk, and means to hold the tool to the said tool holding element.

In testimony whereof I affix my signature in presence of two witnesses.

HOWARD OWEN LEHMAN.

Witnesses:
GEORGE J. RUDDOCK,
FRANK T. LAYTON.

Copies of this patent may be obtained for five cents each, by addressing the "Commissioner of Patents, Washington, D. C."